June 15, 1965     M. B. LAWLESS     3,189,737
HEADLIGHT POSITIONING APPARATUS
Filed March 26, 1963     2 Sheets-Sheet 1
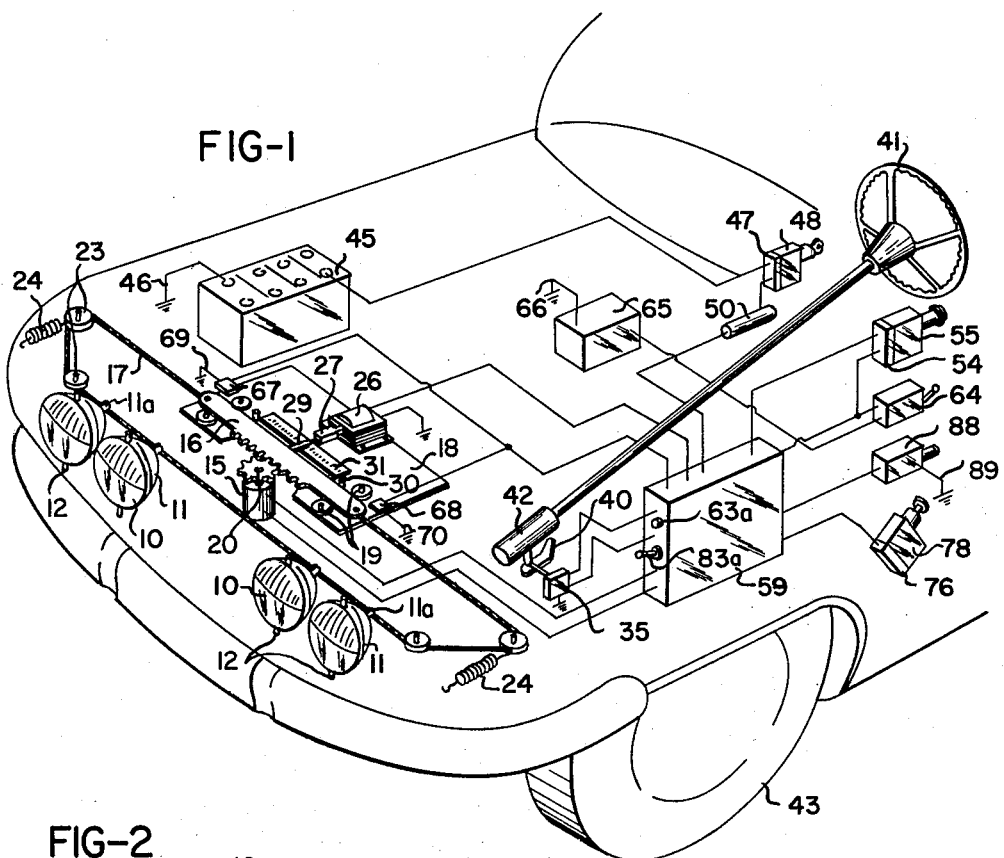
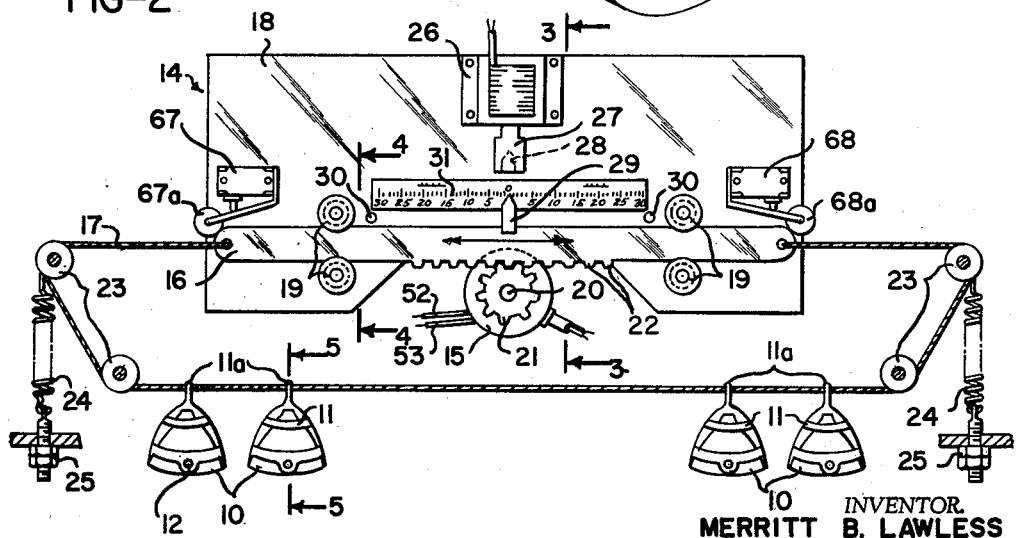
INVENTOR.
MERRITT B. LAWLESS
BY MAHONEY, MILLER & RAMBO
ATTORNEYS June 15, 1965   M. B. LAWLESS   3,189,737
HEADLIGHT POSITIONING APPARATUS
Filed March 26, 1963
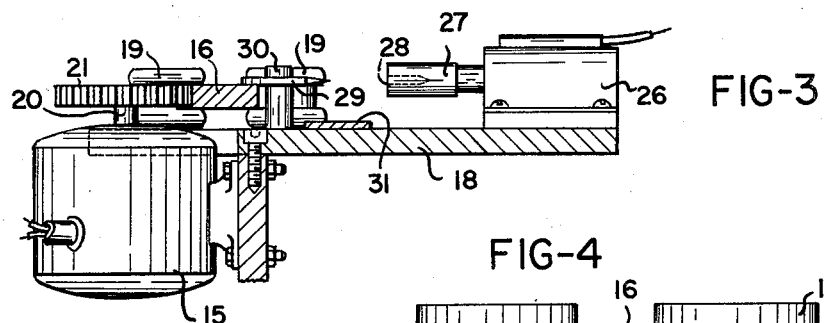
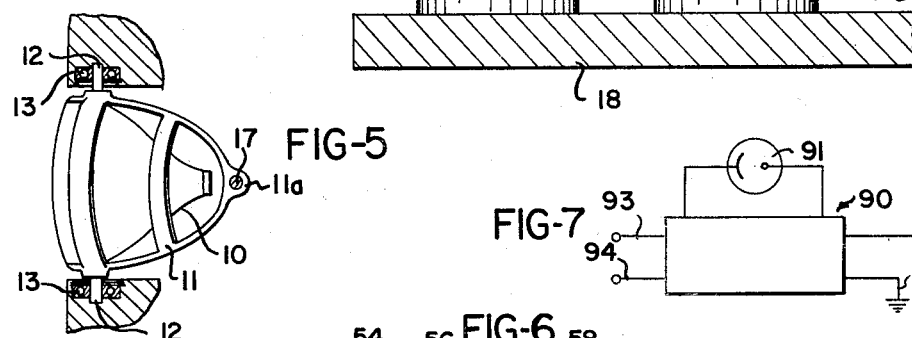
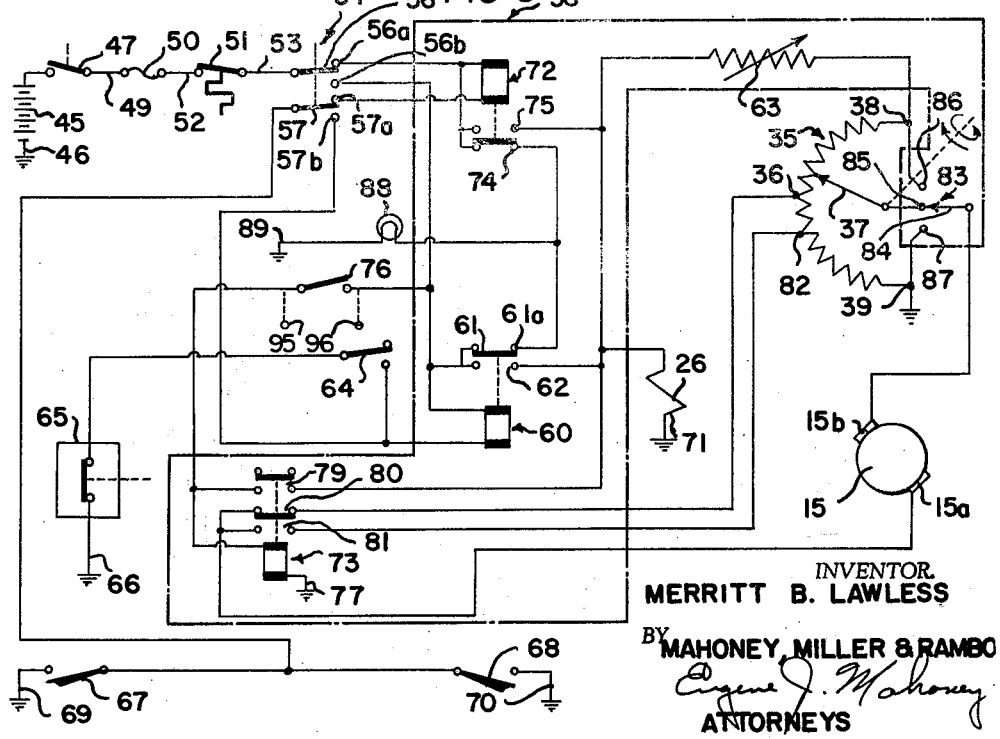
INVENTOR.
MERRITT B. LAWLESS
BY MAHONEY, MILLER & RAMBO
ATTORNEYS

3,189,737
Patented June 15, 1965

3,189,737
HEADLIGHT POSITIONING APPARATUS
Merritt B. Lawless, R.D. 7, Rosenhayn Ave.,
Bridgeton, N.J.
Filed Mar. 26, 1963, Ser. No. 270,489
11 Claims. (Cl. 240—8.25)

This invention relates to a headlight positioning apparatus for a vehicle, such as an automobile, to automatically orientate the beam of the headlights in the direction which the vehicle is turned. It relates, more specifically, to a headlight positioning apparatus which automatically displaces the headlights relative to a fixed axis of the vehicle in response to a displacement of the vehicle direction controlling apparatus.

In the operation of vehicles, particularly automobiles, during hours of darkness, it is essential that the vehicle be provided with one or more headlamps or headlights. The headlights are mounted at the forward end of the vehicle so that when illuminated, they will cast a beam or beams of light forwardly of the vehicle in the path in which it is moving. The headlights are oriented and fixed in position relative to the vehicle to cast a beam generally straight ahead of the vehicle, parallel to the vehicle axis. Since the headlights are generally constructed to cast a divergent beam, the light therefrom will cover a substantially larger portion of the road surface than that occupied by the vehicle at a given distance ahead of the vehicle. The divergence of the beam will become more evident at greater distances from the vehicle. A vehicle, such as an automobile, however, is adapted to undergo rapid changes in direction of travel. In undergoing any change in direction of travel, the vehicle will necessarily follow an arcuate path and is controlled in such movement by a conventional steering gear including the steerable front wheels and a steering wheel. Although the vehicle will travel along an arcuate path, the vehicle axis will remain substantially tangential to this path and likewise the beams from the headlights will remain tangential and will not precede the vehicle so as to illuminate an arcuate path. Therefore, at any substantial distance ahead of the vehicle negotiating a curve, the roadway will not be illuminated or at least not sufficiently for safety. This defect is particularly noticeable in terrain where relatively sharp corners may be encountered as in mountainous terrain. Such hazards are also encountered in typical city driving where ninety degree corners are frequently encountered.

Another factor that must be considered for safety in night driving is that of the glare from an approaching automobile. The beams from the headlights are divergent and will extend into an adjacent vehicle lane at some distance in front of the automobile and will momentarily blind the driver of the approaching vehicle or otherwise reduce the driving visibility. This problem has been partially alleviated by constructing the headlamps with dual filaments or by providing pairs of headlights having dissimilar characteristics. In the dual filament type, one filament is arranged to project a beam forwardly parallel to the vehicle axis and the second filament is arranged to project a beam toward the side of the road opposite the adjacent vehicle lane. The dual headlight system is designed for similar operation. A suitable switching mechanism is provided, either manually or automatically operated, or both, for selecting the desired filament or headlight.

The safety problem involved in the lighting system of an automobile as set out in the previous paragraph has prompted considerable research and development in this field to provide a simple and workable apparatus for shifting the headlight beams to illuminate the road surface in advance of a vehicle negotiating a curve. One such system and apparatus previously developed has included cumbersome step-by-step solenoids. In that type of apparatus, the solenoids are controlled by a switching mechanism actuated by the steering gear. Actuation of the switching mechanism will progressively energize the solenoids to step the headlights in predetermined increments about a vertical axis. Although that type of system is capable of positioning the headlights as desired, the system utilizes components which are cumbersome and subject to considerable wear necessitating replacement and the system is not a continuous-action for smooth movement of the beam across the road surface. To eliminate the step-by-step intermittent operation, another system and apparatus previously developed has consisted of providing a servo-mechanism which requires rather expensive and elaborate components. Both types of systems previously developed have not proven to be entirely satisfactory in operation. The step-by-step solenoid systems do not provide the desired continuous movement and require considerable maintenance to assure continued performance. On the other hand, the servo systems, although providing the desired continuous operation, utilize relatively expensive components and elaborate control systems. Thus, the systems apparatus previously developed have not found wide acceptance because of either the lack of reliability or the relatively high expense in the installation of the system. As a consequence, the vehicles presently on the market are not provided with this much-needed safety feature.

It is, therefore, the primary object of this invention to provide a headlight positioning apparatus for a vehicle which will orientate the headlights in accordance with the vehicle's direction-controlling apparatus to illuminate the proposed path of the vehicle.

It is another object of this invention to provide a headlight positioning apparatus for a vehicle which will orientate the headlights in accordance with the displacement of the vehicle's direction controlling apparatus relative to an axis of the vehicle for projecting beams of light angularly displaced from the vehicle axis to illuminate the proposed path of the vehicle at some distance in advance of the vehicle and laterally of the vehicle axis.

It is a further object of this invention to provide a headlight positioning apparatus which utilizes a simple reversible electric motor to provide the headlight orientating force and a mechanical counterbalancing mechanism in cooperation with a motor input power control that is responsive to a displacement of the vehicle's direction controlling apparatus for limiting the displacement of the headlights in accordance with the vehicle's proposed change of direction.

It is a still further object of this invention to provide a headlight positioning apparatus having an automatic control system which is capable of automatically diverting the headlight beams out of the path of an approaching automobile and toward the opposite side of the road in response to an input signal.

It is still another object of this invention to provide a headlight positioning apparatus having an automatic control system which is capable of locking the headlights against further movement when so desired and when the vehicle has attained a predetermined velocity.

It is also an object of this invention to provide a headlight positioning apparatus which is constructed with simple and inexpensive components that will operate over long periods of time with adequate reliability.

These and other objects and advantages of this invention will be readily apparent from the following description and the accompanying drawings.

In the drawings:

FIGURE 1 is a diagrammatic, perspective view of the front end of an automobile showing the location of the headlight positioning apparatus and associated components.

FIGURE 2 is a top plan view of the headlight displacing mechanism and the counterbalancing mechanism.

FIGURE 3 is an enlarged, vertical, sectional view of the displacing mechanism taken along line 3—3 of FIGURE 2.

FIGURE 4 is an enlarged, vertical, sectional view taken along line 4—4 of FIGURE 2.

FIGURE 5 is an enlarged, vertical, sectional view of the headlight structure taken along line 5—5 of FIGURE 2.

FIGURE 6 is a schematic diagram of the electrical circuit of the positioning apparatus.

FIGURE 7 is a schematic diagram of a photoelectric device for automatically controlling the fixed displacement headlight stepping.

Referring to the drawings, the vehicle diagrammatically illustrated in FIGURE 1 is provided with four headlamps or headlights 10 which are arranged in pairs at each of the opposite sides of the vehicle. Although four headlights have been shown, it is to be understood that the vehicle may be provided with only two, one being disposed at each side of the vehicle. Each of the headlights 10 must be capable of rotational displacement about a substantially vertical axis and each headlight is mounted for this purpose in a frame member 11 which is pivotally supported on the vehicle framework (see FIG. 5). The frames 11 are fabricated from a suitable material to form a rigid structure and are provided with a pair of trunnions 12 adapted to be rotatably disposed in a bearing member 13. The bearing members 13 are secured to the vehicle frame to support the trunnions along a substantially vertically disposed axis. Each of the headlights may, therefore, be pivoted about the vertical axis by applying a torque to the rearwardly projecting portion of the frame 11.

The torque for displacing the headlights 10 is provided by an electrically-controlled positioning mechanism indicated generally by the numeral 14. The positioning mechanism 14 includes a reversible-type electric motor 15 mechanically coupled to a drive plate 16 supported for reciprocal movement. A cable 17 is connected to the opposite ends of the drive plate 16 forming a closed loop therewith. The cable 17 extends through rearwardly-projecting ears 11a formed on the headlight frames 11 and is rigidly secured thereto. Thus, movement of the cable 17 will cause the headlights to pivot in either of opposite directions. The drive plate 16 is mounted for reciprocal movement on a supporting framework or structure 18 which is adapted to be mounted in the forward compartment of the automobile in close proximity to the headlights. Supporting the drive plate 16, which comprises an elongated flat bar of substantially rectangular cross section, are two pairs of spaced-apart rollers 19. Each of the rollers 19 is formed with a main cylindrical body portion having a flange 19a formed at each end thereof with the length of the body portion being substantially equal to the thickness of the drive plate 16. As indicated, the rollers 19 are mounted in pairs for rotation about parallel axes and are spaced apart a distance to receive the drive plate 16 therebetween. The pairs of rollers 19 are disposed to engage opposite ends of the drive plate 16. Movement of the drive plate 16 is thus restricted to reciprocation along the longitudinal axis of the plate.

The motor 15, which includes an outwardly-extending drive shaft 20, is mounted on the supporting structure 18 with the drive shaft 20 disposed parallel to the axis of the rollers 19 and normal to the plane of movement of the drive plate 16. A driving connection is formed between the motor 15 and the drive plate 16 by means of a pinion gear 21 mounted on the motor shaft 20 so as to be in cooperative engagement with the teeth of a rack gear 22 formed on one edge surface of the drive plate. When in a neutral position, the rack gear 22 will be engaged by the pinion gear 21 at substantially the midpoint thereof permitting the drive plate 16 to be propelled in either of opposite directions an equal distance for pivoting the headlights 10 through the interconnecting cable 17.

As illustrated in FIGURE 1, the positioning mechanism 14 and the cable 17 are disposed in a substantially horizontal plane but this arrangement may be varied in reference to other vehicles and installations as desired. To support the cable 17 in a horizontal plane, four pulleys 23 are mounted on the vehicle frame which are arranged in a generally rectangular pattern and maintain the cable in a loop. Each pulley 23 is rotatably mounted on the vehicle frame at a suitable location (the supporting portion of the vehicle frame not shown) to avoid interference with other elements or components of the vehicle. If necessary, additional pulleys may be provided to support the cable 17 in other configurations and provide adequate clearance. A cable type installation may be readily installed in the vehicle in the most convenient manner providing wide latitude in the location of the positioning mechanism. For example, the positioning mechanism may be located at one side of the vehicle out of the way of the radiator and other elements located in the front portion of the vehicle.

The motor 15 remains energized during the operation of the system, as will be more fully explained hereinafter, and to prevent excessive movement of the headlights in either direction, a counterbalancing mechanism of the mechanical type is provided. The counterbalancing mechanism includes a pair of tension springs 24 which are connected to the cable 17 in opposed relationship. The opposite ends of the springs 24 are rigidly connected to the framework of the vehicle by means of suitable connecting devices 25, such as a screw-threaded rod and associated nut. Movement of the drive plate 16, and the torque of the motor, in either direction is thus opposed by the springs 24. The counterbalancing force provided by either of the springs 24 is directly proportional to the displacement of the drive plate 16 and the corresponding extension or elongation of a spring. The relationship of the extending force and elongation of a spring is substantially linear within its designed limits of operation and a greater counterbalancing force will therefore be provided by the springs 24 as the drive plate 16 is displaced a corresponding greater distance from its neutral or center position. The torque or displacing force provided by the motor 15 may be varied, particularly in the case of a direct current motor, by varying the input voltage applied thereto and an increase of the voltage applied will produce a corresponding increase in the torque. Therefore, at any specific displacement of the drive plate 16, the torque of the motor 15 as a function of the applied voltage will be counterbalanced by the appropriate spring 24. Adjustment of the apparatus for purposes of calibration may be readily accomplished by means of the nut and threaded rod type connecting devices 25. The center position of the mechanism is varied by varying the anchor point of the springs 24 through adjustment of the nut and rod assemblies.

A locking means is provided for maintaining the drive plate 16 in its neutral or center position, as desired. The locking means includes an electrically-actuated solenoid 26 having a movable plunger 27 which is extended a distance outwardly when the solenoid is deenergized. Preferably, the solenoid 26 is provided with a spring (not shown) for forcibly extending the plunger 27 when the solenoid is deenergized. The solenoid 26 is mounted on the supporting structure 18 in such a manner that the plunger 27 may be moved normally to the drive plate 16. A socket 28 is formed in the outwardly extending end of the plunger 27 for receiving an index or locking finger 29, attached to the drive plate 16 at the midpoint thereof. The locking finger 29 extends a distance laterally from the drive plate 16 toward the plunger 27 and is formed with a pointed end to facilitate insertion in the socket 28 of the plunger. To lock the drive plate 16 in its center or neutral position, the plunger 27 of the solenoid is extended toward the index finger 29 and receives the index finger within the socket 28 thereof. Since the locking solenoid 26 is rigidly fixed to the supporting structure 18, the drive plate 16 will be restricted from further reciprocal movement.

Damage to the headlights through excessive displacing movement is prevented by a pair of stop pins 30 mounted on the supporting structure 18. Each of the stop pins consists of a cylindrical rod disposed adjacent to the drive plate 16 and extending a distance upwardly from the upper surface of the supporting structure 18. Each of the pins extends a distance upwardly to engage the index finger 29. By appropriately spacing the stop pins 30, the index finger 29 will prevent excessive movement of the drive plate 16 and the headlights 10 by engaging the stop pins 30.

Attached to the upper surface of the supporting structure 18, in a clearly visible location, is a balancing and calibrating scale 31. The scale 31 is imprinted with suitable indicia and is arranged in parallel relationship to the drive plate 16 with the index finger 29 projecting over the scale. Since the headlights are angularly displaced, the scale is preferably marked in degrees for convenient interpretation. After initial installation, which is assumed to be accurate, the apparatus may be periodically checked to ascertain that the headlights are returned to their straight-ahead center position when the vehicle is moving in a straight line by quick reference to the scale. When the index and locking finger 29 is released by the solenoid plunger 27 and the motor 15 is not energized, the drive plate 16 is free to move to a center position as determined by the springs 24. Should the actual center position be at variance with the scale index center position, the springs 24 may be adjusted as previously described until the index finger 29 coincides with a center index mark on the scale 31. Additional scale markings are provided for visual ascertainment of the displacement for the calibration procedures to be subsequently described.

The electrical control system, referring to the schematic diagram of FIGURE 6, is designed to automatically perform the function of controlling the displacement of the headlights 10 during low speed driving and locking the headlights in a straight-ahead position at high speeds. Displacement of the headlights 10 during normal driving is proportional to the angular displacement of the steerable wheels and will be in the direction of the turn in order that the beams will project onto the proposed vehicle track at some distance in advance of the vehicle. The displacement of the headlights is proportional to the displacement of the steerable wheels with the actual ratio being such that the projected beam will intersect the track at some point in advance of the vehicle and adequately illuminate the roadway and hazardous conditions. The radius of curvature of roadways adapted for high speeds is generally large and the headlights will be capable of illuminating the roadway an adequate distance in advance of the vehicle without being displaced from a fixed position in alignment with the vehicle axis. In this instance, the control circuit will function to lock the headlights in a fixed position through a switch means that is responsive to the speed of the vehicle.

The control circuit is also designed to displace the headlights a fixed number of degrees away from an adjacent lane of traffic which is moving in an opposite direction and thereby avoid blinding the driver of an approaching vehicle. The direction of the displacement would be to the right of the vehicle in the case of an automobile. This control function may be effected by either manual actuation of a switch or by an auxiliary automatic switch device. If desired, the manual type of switch may be incorporated with the conventional foot operated dimmer switch to simultaneously displace the headlights away from the approaching lane of traffic and to energize the passing beam filaments or head-lights. The auxiliary automatic switch device may be similarly incorporated with the foot-actuated headlight dimming circuit. Another advantage of a fixed displacement is that it is possible to better illuminate signs located at the side of the road at closer range to the vehicle than is possible with only the conventional headlight dimming circuits.

Displacement of the headlights in either or opposite directions is accomplished by means of the motor 15 which is of the reversible type, preferably designed for direct current operation, having an output torque characteristic which increases with an increase in the applied voltage. With the direct current type motor, reversibility is accomplished by merely reversing the polarity of the voltage applied to the motor and torque control is obtained through control of the magnitude of the applied voltage. Accordingly, this invention provides means for reversing the polarity and varying the magnitude of the voltage applied to the motor comprising a potentiometer 35 provided with a fixed center-tap 36. One terminal of the motor 15 is connected to the center-tap 36 and the other terminal is connected to a wiper arm 37. When a constant, predetermined voltage is applied to the end terminals 38 and 39 of the potentiometer 35, movement of the wiper arm 37 to opposite sides of the center-tap 36 will effect a change in polarity as the center-tap forms a reference point of zero potential relative to the motor 15 when the wiper arm 37 is coincident therewith. It is readily apparent that the wiper arm 37 will become either positive or negative relative to the center-tap 36, when moved a distance to one side of the center-tap. The magnitude of the voltage applied to the motor 15 is dependent on the distance which the wiper arm 37 is displaced from the center-tap 36 and is directly proportional thereto.

The direction and degree of displacement of the headlights is preferably responsive to and a function of the displacement of the vehicle's steering apparatus for automatic operation. For this reason, the wiper arm 37 is mechanically coupled to a suitable motion producing member 40 (see FIG. 1) of the steering apparatus. Displacement of the vehicle's steering apparatus, which also includes the conventional steering column 41, gear box 42 and steerable wheels 43, only one wheel being shown, will thus rotate the wiper arm 37 proportionally in the appropriate direction. The accuracy with which the headlights are displaced relative to a displacement of the wheels 43 is improved by selecting as the motion producing member 40, a member having relatively little lost motion occurring during a reversal of direction. Preferably, the member 40 is located between the wheels 43 and the gear box 42 as there is generally considerable lost motion between the steering column 41 and the output shaft of the gear box.

An electrical power source for the apparatus may comprise the usual battery 45 that is provided for operation of the vehicle's conventional electrical system. In an installation utilizing the usual vehicle battery, the motor 15 must be of such a design as to be operable within the electrical rating of the battery. A conventional vehicle battery installation also includes a ground connection 46 interconnecting a terminal of the battery and the metal electrically conducting portions of the vehicle's frame. The ground connection 46 completes the return circuit for the headlight positioning apparatus as well as the conventional electrical system of the vehicle. All other ground connections of the apparatus are to be considered as made to the vehicle frame for completion of the circuit.

The battery 45 is connected to the positioning apparatus through a power supply circuit including a disconnect switch 47 and the usual circuit protective device. For convenience of operation, the disconnect switch 47 may comprise a set of normally open contacts incorporated in the key type ignition switch 48 of the vehicle. Thus, the operator will be assured that the positioning apparatus will be disconnected from the battery 45 at all times when the key is removed. A conductor 49 is connected between a terminal of the battery 45 and a terminal of the switch 47. The protective devices include a current overload fuse 50 and a thermal switch 51 serially connected with each other and the disconnect switch 47. Since the thermal switch 51 is located within the motor 15 and is of well known construction, the switch is not shown in the drawing other than symbolically in the schematic diagram of FIGURE 6 and by the conductors 52 and 53 (also see FIGURE 2).

A two-position selector switch 54 is provided which provides for either the automatic operation of the positioning apparatus when the headlights are in operation or the return of the apparatus to a neutral position. In the neutral position, the headlights are maintained in a fixed, immovable position irrespective of the displacement of the wheels 43. This switch may be advantageously incorporated, as an auxiliary section, for example, in the usual push-pull type headlight switch 55. When properly connected into the circuit, the switch 54 will permit return of the apparatus to a neutral position when the light switch is pushed to an "off" or "parking lights only" position and automatic operation of the apparatus when pulled to an "on" position thus illuminating the headlights. The switch 54 is of the two-pole, double-throw type having one pole 56 connected to the conductor 53 of the power supply circuit and selectively engageable with either of two associated contact terminals 56a and 56b. The second pole 57 is also selectively engageable with either of two associated contact terminals 57a and 57b. Both of the poles 56 and 57, are mechanically coupled for simultaneous operation between an "A" position in contact with the terminals 56a and 57a and a "B" position in contact with the terminals 56b and 57b.

Automatic operation of the apparatus, including the functions of providing for the return of the headlights to a neutral position, centering and locking, and of displacing or stepping the headlights a fixed number of degrees to the right of the vehicle axis as a courtesy to approaching traffic, is provided by an electrical relay circuit. The relay circuit is denoted generally by the numeral 58 in the circuit diagram of FIGURE 6 and is mounted in a suitable enclosure 59 indicated in FIGURE 1. The enclosure 59 is mounted in the forward compartment of the vehicle and preferably in close proximity to the positioning mechanism 14. Suitable adjusting or calibrating controls are also provided and conveniently mounted in the enclosure 59 and adjustment or calibration may be performed by a single technician who has a clear view of the adjusting and calibrating scale 31.

An operating or "on" relay 60 is connected in the relay circuit to energize the motor 15 during normal driving conditions when the headlights are on and the vehicle is moving at a speed below a predetermined rate. One terminal of the solenoid coil of the relay 60 is connected to terminal 56b of the selector switch 54. The opposite terminal of the coil may be connected to the vehicle frame through one or more grounding systems which are independently, selectively operable, as will be more fully described hereinafter. A circuit may thus be completed for energization of the relay 60 through co-operative operation of the switch 54 and at least one of the grounding systems. Controlled by the solenoids of the relay 60 are a set of normally closed contacts 61 and a set of normally open contacts 62. The normally open set of contacts 62 are connected in series between the terminal 56b of the selector switch 54 and the ungrounded terminal 38 of the potentiometer 35. An adjustable resistance 63 is also connected in series with the potentiometer 35 between the potentiometer and the contacts 62 for calibrating the apparatus. The resistance 63 is provided with an adjusting means 63a, such as a rotatable shaft formed wtih a screwdriver slot at one end, and is mounted in the enclosure 59 in such a manner that the adjusting means is readily accessible from the exterior.

One of the grounding systems for the operating relay 60 includes a series-connected, manually actuated switch 64 and a speed responsive contactor 65. The switch 64 is of the two position type that is adapted to be mounted on the dashboard of the vehicle where it may be conveniently reached by the operator. When this switch is in the open position, the grounding system will be ineffective to permit energization of the operating relay 60. The contactor 65 is mechanically coupled to a member of the drive train of the vehicle, the transmission for example, and includes a set of contacts which are maintained in a closed position when the vehicle is motionless or is moving at a velocity less than a predetermined value. As an example, the contactor may be designed to open when the vehicle attains a speed of 40 m.p.h. since most curves adapted for driving at this speed will have a large radius of curvature and it will be unnecessary to displace the headlights. One terminal of the contactor 65 is connected to the vehicle frame by a grounding connection 66.

A second grounding system is provided to permit return of the headlights 10 and associated positioning mechanism 14 to a central or neutral position and to thereafter automatically deenergize the operating relay 60. This grounding system includes the pole 57 and its associated terminal 57b of the selector switch 54 connected in series with two parallel connected limit switches 67 and 68. The terminal 57b is connected to the ground terminal of the operating relay 60 and the pole 57 is connected to a terminal of each limit switch 67 and 68. The opposite terminal of each limit switch is attached to the vehicle frame by a grounding connection 69 and 70, respectively.

The limit switches 67 and 68 are preferably of the microswitch type having a set of normally open contacts actuated by roller type cam followers 67a and 68a. Each of the switches, 67 and 68, is mounted on the supporting structure 18 of the displacing mechanism at opposite ends thereof to engage the respective end portions of the drive plate 16. For this purpose, the marginal end portions of the drive plate 16 are of arcuate form to facilitate movement of the cam followers 67a and 68a. The switches are positioned relative to the drive plate 16 so that the contacts thereof will be simultaneously open when the drive plate is disposed in a central or neutral position as indicated in FIG. 2. Thus, movement of the drive plate 16 in either direction will result in closing of the contacts on one switch 67 or 68, and assure maintenance of a ground circuit at all times the drive plate is displaced from neutral.

The coil of the locking solenoid 26 is connected in parallel with the series connected resistance 63 and potentiometer 35 for simultaneous energization therewith. One terminal of the solenoid coil is connected to a terminal of the operating relay contacts 62 and the other grounded to the vehicle frame through a grounding connection 71. Energization of the operating relay 60 will thus energize the locking solenoid 26 thereby disengaging the plunger 27 from the index or locking finger 29 permitting displacement of the drive plate 16 in either direction.

Also included in the relay circuit 58 is a locking relay 72 and a stepping relay 73. The locking relay 72 includes a coil having the respective terminals thereof connected to the terminals 56a and 57a of the selector switch 54. In the usual "off" position of the selector switch 54 and the "off" or "parking position" of the headlight switch 55, the coil of the relay 72 would be energized as the poles 56 and 57 are in the "A" position in engagement with their respective terminals 56a and 57a. This is based on the assumption that one of the grounding switches, 67 or 68, is closed to complete the circuit. The locking relay 72 is provided with a set of normally closed contacts 74 and a set of normally open contacts 75. One terminal of each set of contacts, 74 and 75, is connected to the terminal 56a. The opposite terminal of the normally closed set of contacts 74 is connected to a terminal 61a of contacts 61, and the opposite terminal of the normally open contacts 75 is connected to the lead interconnecting the adjusting resistor 63, the solenoid 26 and the contacts 62 of the operating relay 60.

The stepping relay 73 includes a coil having one terminal connected to terminal 56b of the selector switch 54 through a normally open switching device 76. The opposite terminal of the relay coil is connected to the vehicle frame through a grounding connection 77.

In this embodiment, the switching device 76 consists of a set of normally open contacts incorporated in a foot-actuated headlight dimming switch 78. The dimmer switch is of a type having two operating positions. Each of the operating positions is attained by merely pressing the plunger of the switch downwardly in the usual manner. The first position would close a set of contacts connected in the headlight circuit and results in alternately energizing each of the filaments in a typical dual beam type headlight or each of the headlights 10 is a dual headlight system. The second position is reached subsequent to the first position and results in closing the contacts of the switching device 76 and energization of the relay 73. Holding the dimmer switch 78 in the second position will maintain the switch 76 closed.

Connected in series between the switching device 76 and the locking solenoid 26, adjusting resistor 63 and potentiometer 35 is a set of normally open contacts 79 switching device 76 and energization of the relay 73. Upon energization of the relay coil, through closing of the switching device 76, the contacts 79 will be closed to complete a circuit to the locking solenoid 26 and the potentiometer 35. A second set of contacts 80 actuated by the coil of the stepping relay 73 are of the normally closed type and are connected in series between the center tap 36 of the potentiometer and a terminal 15a of the motor 15. A third set of contacts 81 actuated by the relay coil are of the normally open type and are connected in series between a second fixed tap 82 of the potentiometer 35 and terminal 15a of the motor.

The tap 82 is displaced a distance from the center reference tap 36 to result in movement of the headlights a predetermined number of degrees to the right. In effect, the tap 82 shifts the reference point a fixed number of degrees to the right and the headlights will then be displaced about the new reference point. The number of degrees which the tab 82 is displaced is preferably determined by the particular requirements of a specific installation and safety conditions. A displacement of the order of 10° has been found satisfactory in the present embodiment.

For convenience in adjusting and calibrating the apparatus, a test switch 83 is provided which permits a single operator to determine the correctness of the displacement in either direction. The switch 83 is of the three-position type having a movable contact arm 84 which is connected to terminal 15b of the motor and may be of the well known toggle form incorporating a spring centering feature. A center contact 85 is connected to the wiper arm 37. Two other contacts 86 and 87 are connected to the end terminals 38 and 39 of the potentiometer, respectively. The switch is operable to simulate actual movement of the wiper arm 37 to either of the extreme positions without physical displacement of the steerable vehicle wheels 43. The switch 83 is mounted within the enclosure 59 and is provided with a control handle 83a which projects exteriorly of the enclosure.

The calibration procedure consists of setting the test switch 83 to alternately engage the contact arm 84 with the contacts 86 and 87. Assuming that the potentiometer is accurately center tapped and the positioning mechanism 14 is properly centered by adjustment of the springs 24, setting the test switch 83 as indicated will result in maximum displacement of the headlights in opposite direction. The actual displacement may be noted on the scale 31 which is also provided with index points corresponding to the desired maximum displacement of the headlights. Should a variance be noted in the maximum displacement produced through the test switch and that desired, correction may be made by adjustment of the calibrating resistance 63. Adjustment of the resistance 63 will increase or decrease the voltage applied to the potentiometer 35 resulting in a proportional increase or decrease in the voltage applied to the motor 15 and its output torque. The index finger 29 on the drive plate 16 may thus be made to coincide with maximum points on the scale 31 for each of the test positions in cooperation with the counterbalancing springs 24.

A visible signal indicating that the apparatus has been locked is provided the operator by signal lamp 88. The signal lamp 88 is of the panel mounting type and is attached to the dashboard where clearly visible by the operator. One terminal of the lamp 88 is connected to the terminal 61a of the operating relay 60 and the other terminal to the vehicle frame by a suitable ground connection 89.

As an alternate switching device to bypass the switch 76, a set of contacts of the normally open type (not shown) may be incorporated in a photo-electric automatic light dimming device 90. A typical commercially available photo-electric device 90, such as is now provided as an accessory on many vehicles and schematically illustrated in FIG. 7, may be utilized for this purpose by the simple modification of adding a set of normally open contacts to the relay of the device. The device includes a photo-electric tube 91 and is connected to a suitable power source, the battery 45 for example, through a terminal on the headlight switch 55. For purposes of illustration, the device is shown as connected to terminal 56b of the selector switch and is also provided with a ground connection 92. The contacts are connected by a pair of leads 93 and 94 into the circuit at terminals 95 and 96. Other contacts in the device would be connected to the conventional lighting system in the usual manner. The light from an approaching vehicle will automatically actuate the device to close the contacts and complete the circuit to the stepping relay 73 as would the switch 76.

For typical night-time operation of the headlight-positioning apparatus, the vehicle would be in operation and the switch 47 closed and the selector switch 54 would be in the "B" position. The headlights 10 would also be illuminated through the conventional vehicle electrical system which is well known and, therefore, is not illustrated or described. Also, the calibrating switch 83 would be set with the movable arm 84 in engagement with the center terminal contact 85. With the selector switch 54 in the "B" position, the operating relay 60 is energized and closes contact 62 provided switch 64 or one of the limit switches, 67 or 68, is closed and the speed of the vehicle is below that which would open the contactor 65. The locking solenoid 26 will be energized to release the index or locking finger 29 and permit movement of the drive plate 16 and a voltage will be applied to the terminals 38 and 39 of the potentiometer 35. At any time the wiper arm 37 does not coincide with the center tap 36, a voltage will also be applied to the terminals 15a and 15b of the motor. Since the wiper arm 37 is driven by the steering apparatus, the voltage and polarity will be proportional to the displacement of the steerable wheels. Application of a voltage to the motor 15 will produce a torque resulting in displacement of the drive plate 16 with the displacement being limited by the springs 24 which counterbalance the motor torque at any displacement. Thus, the headlights 10 will be displaced proportionally in accordance with the steerable wheels 43 and the headlight beams will be projected onto the roadway at a distance in advance of the vehicle even though the vehicle is traversing a curve.

When it is desired to lock the headlights 10 in a center or neutral position, although the selector switch 54 remains in the "B" position, the switch 64 may be opened to remove one of the grounding systems. Should the headlights be displaced from center at the time the switch 64 is opened, the second grounding system will remain operational through one of the limit switches 67 or 68. The second grounding system will be disrupted the first time that the headlights return to center as both limit switches will then be open. The operating relay 60 will then be deenergized permitting the contacts 62 to open and disconnect the potentiometer 35, the locking solenoid 26 and the motor 15 from the battery 45 and associated power supply circuit. Deenergization of the locking solenoid 26 permits the plunger 27 to engage the index or locking finger 29 of the drive plate 16 and thus prevent further movement thereof.

The positioning apparatus may also be locked by positioning the headlight switch 55 in an "off" or "parking" position. Simultaneously, the selector switch 54 will be placed in the "A" position. Assuming that the headlights 10 have been displaced from a center position, the locking relay 72 will be energized through the alternate grounding system. Energization of relay 72 opens contacts 74 and closes contacts 75 and thus connects the potentiometer 35, the motor 15 and the locking solenoid 26 into the circuit. The plunger 27 of the locking solenoid will be withdrawn from the path of the index or locking finger 29 and permit centering of the drive plate 16. Turning the vehicle's steering apparatus past center will also bring the drive plate 16 to center where both of the limit switches, 67 and 68, will be opened thus de-energizing the locking solenoid 72. Simultaneously with de-energization of the locking solenoid 72, contacts 75 will be opened and disconnect the locking solenoid 26, the potentiometer 35 and the motor 15. As previously described, the positioning mechanism 14 will be inoperative to cause further displacement of the headlights 10 and the headlights will be in a center position for better appearance.

It is readily apparent that the locking relay 72 does not perform any function that cannot be performed by merely opening the switch 64. The sole purpose of the locking relay 72 is to provide a convenient means of automatically locking the headlights 10 in a center position simultaneously with turning the headlights off. It eliminates the necessity of the vehicle operator performing the locking operation in sequence and to properly manipulate the switches.

The remaining automatic operational feature of the headlight positioning apparatus of this invention is to displace the headlights a fixed number of degrees to the right referred to herein as stepping. The automatic stepping is accomplished by the stepping relay 73 and is initiated by closing the switch 76. The closing of the switch 76 by pushing the dimer switch 78 to the second position and holding completes a circuit for energization of the relay and closing of its associated contacts 79 and 81. Simultaneously, contact 80 will be opened to disconnect the center tap 36 from the motor circuit. Power is supplied to the locking solenoid 26, the potentionmeter 35 and the motor 15 through the contacts 79 irrespective of the operating coil 60. For operation during movement of the vehicle, the stepping relay 73 is effective to shift the reference point the specified number of degrees resulting in the headlights 10 being displaced to the right a proportional number of degrees. Regardless of whether the vehicle is negotiating a curve or moving in a straight line, the headlights will be displaced the specified number of degrees to the right of the position the headlights would normally be at under control of the operating relay 60. The stepping relay 73 is operative to effect a displacement at any time the selector switch 54 is placed in the "B" position. Opening of the contactor 65 due to operation of the vehicle at a speed above the predetermined speed will not prevent stepping of headlights. Similarly, should the switch 64 be opened to lock the positioning mechanism 14, the stepping relay 73 will unlock the positioning mechanism and step the headlights to the right the specified number of degrees.

It is readily apparent that the positioning apparatus of this invention is capable of accurately displacing the headlights of vehicle in the direction which the vehicle is to be turned for illumination of a curved roadway in advance of the vehicle. The positioning mechanism is of simple and novel construction utilizing relatively inexpensive components. The counterbalancing mechanism is of particular advantage as the headlights will be automatically centered when the power is removed from the motor and provides a novel safety feature. Displacement or stepping of the headlights to the right for passing approaching vehicles provides additional safety in driving by directing the headlight beams to the right and further out of the adjacent traffic lane, thereby decreasing the possibility of temporarily blinding the operator of the approaching vehicle.

In accordance with the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a vehicle including a directional controlling apparatus, an electrical power source and at least one headlight mounted for rotational displacement; an automatic headlight positioning apparatus comprising a positioning mechanism mechanically coupled to said headlight for selective rotational displacement thereof, said positioning mechanism including electrically operated displacing means proportionally responsive to an applied voltage and counterbalancing means for limiting displacement of said headlight, and circuit means interconnecting said power source with said displacing means and including voltage control means for varying the voltage applied to said displacing means, said voltage control means being responsive to said vehicle directional controlling apparatus, an electrical relay device having a coil and a set of normally open contacts serially connected between said power source and said voltage control means for the selective operation thereof, and a selectively operable grounding system for connecting the coil of said relay device to said power source for the energization thereof and closing of the respective contacts, said grounding system including a two-position switch member having an open position and serially connected with a contactor having a set of normally closed contacts, said contactor being mechanically coupled to a speed-responsive member of said vehicle and operable to open said contacts when the vehicle is being operated in excess of a predetermined speed.

2. The structure of claim 1 wherein said grounding system includes a pair of shunt connected, normally open switch members selectively connectable in series relationship to the coil of said relay device, said switch members being disposed relative to said displacing means whereby displacement of said displacing means from a predetermined center position will close one of said switch members.

3. The structure of claim 1 wherein said positioning mechanism includes a locking device comprising an electrical solenoid having a plunger cooperatively engageable with said displacing means to normally prevent relative movement thereof and an electrical coil operable to disengage said plunger from said displacing means, said electrical coil being connected in said circuit means for energization on closing of the contacts of said relay device.

4. In combination with a vehicle including a directional controlling apparatus, an electrical power source and at least one headlight mounted for rotational displacement relative to said vehicle; an automatic headlight positioning apparatus comprising a positioning mechanism mechanically coupled to said headlight for selective rotational displacement thereof in opposite directions, said positioning mechanism including electrically operated displacing means proportionally responsive to an applied voltage and counterbalancing means for limiting displacement of said headlight in proportion to said applied voltage, and circuit means interconnecting said power source with said displacing means and including a potentiometer selectively connectable to said power source for varying the voltage applied to said displacing means, said potentiometer including a movable wiper arm electrically connected to a first terminal of said displacing means and mechanically coupled to said vehicle directional controlling apparatus for movement therewith to either side of an electrical center tap of said potentiometer and a second fixed tap electrically displaced to one side of said center tap, first contact means selectively operable to alternately connect said center tap and said second tap to a second terminal of said displacing means, and second contact means connected in series between said power source and said potentiometer and being simultaneously operable with said first contact means to complete a circuit to said potentiometer when said first contact means is selectively operated to connect said second tap to said displacing means.

5. The structure of claim 4 wherein said contact means are included in a relay device having an operating coil selectively connectable to said power source through a switch means.

6. The structure of claim 5 wherein said switch means includes a set of normally open contacts controlled by an automatic device responsive to the intensity of incident illumination.

7. In combination with a vehicle including a directional controlling apparatus, an electrical power source and at least one headlight mounted for rotational displacement relative to said vehicle; an automatic headlight positioning apparatus comprising a positioning mechanism mechanically coupled to said headlight for selective rotational displacement thereof in opposite directions, said positioning mechanism including electrically operated displacing means proportionally responsive to an applied voltage and a locking device having an electrical solenoid provided with a plunger cooperatively engageable with said displacing means to normally prevent relative movement thereof and an electrical coil operable on energization to disengage said plunger from said displacing means, and circuit means interconnecting said power source with said displacing means and including a potentiometer selectively connectable to said power source for varying the voltage applied to said displacing means, said potentiometer being responsive to said vehicle directional controlling apparatus.

8. The structure of claim 7 wherein said circuit means includes a relay device having an operating coil connectable to said power source through a selectively operable switch means and a grounding system, said grounding system having normally open contact means responsive to said displacing means and being closed when said displacing means is displaced from a center position for energization of the operating coil of said relay device and open when said displacing means is substantially at said center position, said relay device having a normally open set of contacts connected in series between said power source and said locking device and potentiometer for energization thereof on energization of the operating coil of said relay device.

9. In combination with a vehicle including a directional controlling apparatus, an electrical power source and at least one headlight mounted for rotational displacement relative to said vehicle; an automatic headlight positioning apparatus comprising a positioning mechanism mechanically coupled to said headlight for selective rotational displacement thereof in opposite directions, said positioning mechanism including electrically operated displacing means proportionally responsive to an applied voltage and counterbalancing means for limiting displacement of said headlight in proportion to said applied voltage, and circuit means interconnecting said power source with said displacing means including a potentiometer selectively connectable to said power source for varying the voltage applied to said displacing means, said potentiometer having a movable wiper arm electrically connected to a first terminal of said displacing means and mechanically coupled to said vehicle directional controlling apparatus for movement therewith to either side of an electrical center of said potentiometer and a fixed tap disposed at the electrical center of said potentiometer connectable to a second terminal of said displacing means, and a calibrating means connected in said circuit and selectively operable to correlate the displacement of said headlight in fixed relationship to said directional controlling apparatus in cooperation with said counterbalancing means.

10. The structure of claim 9 wherein said calibrating means includes an adjustable resistance connected in series with said potentiometer for decreasing the voltage applied thereto relative to said power source.

11. The structure of claim 10 wherein said calibrating means includes switch means interposed in said circuit between said potentiometer and said first terminal of said displacing means, said switch means having a first contact connected to said potentiometer wiper arm, a second contact connected to said potentiometer at a predetermined point relative to said center tap, a third contact connected to said potentiometer at a point on the opposite side of the center tap electrically equal to said second contact, and a movable contact member selectively operable to engage each of said contacts.

References Cited by the Examiner

UNITED STATES PATENTS

| | | | |
|---|---|---|---|
| 1,186,028 | 6/16 | Opp | 240—8.25 |
| 1,361,468 | 12/20 | King | 240—62 X |
| 1,547,490 | 7/25 | Bailey | 240—41.61 |
| 2,049,802 | 8/36 | Hamm | 240—62.3 |
| 2,636,111 | 4/53 | Salzer | 240—62.51 |
| 2,876,384 | 3/59 | Brown | 240—8.25 X |
| 3,116,026 | 12/63 | Gupta | 240—62.7 X |

FOREIGN PATENTS

| | | |
|---|---|---|
| 450,858 | 1/13 | France. |
| 886,852 | 8/53 | Germany. |

NORTON ANSHER, *Primary Examiner.*

UNITED STATES PATENT OFFICE
CERTIFICATE OF CORRECTION

Patent No. 3,189,737

June 15, 1965

Merritt B. Lawless

It is hereby certified that error appears in the above numbered patent requiring correction and that the said Letters Patent should read as corrected below.

Column 3, line 31, after "pair" insert -- of --; column 9, line 32, for "switching device 76 and energization of the relay 73." read -- which are actuated by the coil of the stepping rela 73. --.

Signed and sealed this 16th day of November 1965.

(SEAL)
Attest:

ERNEST W. SWIDER
Attesting Officer

EDWARD J. BRENNER
Commissioner of Patents